(12) United States Patent
Hörnig

(10) Patent No.: US 7,456,387 B2
(45) Date of Patent: Nov. 25, 2008

(54) METHOD FOR DETERMINATION OF THE QUALITY OF A BUTTING ON AN AT LEAST PARTIALLY MANUFACTURED X-RAY DETECTOR

(75) Inventor: Mathias Hörnig, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/512,167

(22) Filed: Aug. 30, 2006

(65) Prior Publication Data

US 2007/0057170 A1 Mar. 15, 2007

(30) Foreign Application Priority Data

Sep. 1, 2005 (DE) .................... 10 2005 041 631

(51) Int. Cl.
G12B 13/00 (2006.01)
(52) U.S. Cl. .................................. 250/252.1
(58) Field of Classification Search .............. 250/252.1; 378/98, 98.2, 98.3, 98.4, 98.5, 98.6, 98.7, 378/98.8, 98.9, 98.1, 98.11, 98.12, 207; 356/638
See application file for complete search history.

(56) References Cited

U.S. PATENT DOCUMENTS

| | | | |
|---|---|---|---|
| 4,473,843 A | 9/1984 | Bishop et al. | |
| 5,528,043 A * | 6/1996 | Spivey et al. | 250/370.09 |
| 6,418,241 B1 * | 7/2002 | Schreiner | 382/263 |
| 6,718,011 B2 * | 4/2004 | Spahn | 378/98.8 |
| 6,854,885 B2 * | 2/2005 | Wischmann et al. | 378/207 |
| 2003/0016788 A1 * | 1/2003 | Spahn | 378/98.8 |
| 2003/0169847 A1 | 9/2003 | Karellas et al. | |
| 2004/0200971 A1 * | 10/2004 | De Keyser | 250/370.09 |
| 2006/0291626 A1 * | 12/2006 | Hornig | 378/98.8 |

FOREIGN PATENT DOCUMENTS

| | | |
|---|---|---|
| DE | 101 35 427 A1 | 2/2003 |
| DE | 101 49 404 A1 | 4/2003 |
| EP | 1 467 226 A1 | 10/2004 |

OTHER PUBLICATIONS

Machine vision and its integration with CIM systems in the electronics manufacturing industry (John Edwards) Loughborough University of Technology 2006Q14447.

* cited by examiner

Primary Examiner—Constantine Hannaher
Assistant Examiner—Kiho Kim
(74) Attorney, Agent, or Firm—Harness, Dickey & Pierce P.L.C.

(57) ABSTRACT

In order to determine the quality of a butting during the manufacture of a flat X-ray detector, it is sufficient for the mounting plate of the detector to be produced with detector plates which are connected by butting, and for a backlight board to be provided in order to illuminate the pleats through the mounting substrate. At least one backlight image is recorded with the aid of the backlight board and the detector plates, and is evaluated automatically in order to determine whether, in the zone of the image of the butting structure, it has areas which are illuminated more than averagely strongly or weakly, based on a predetermined assessment criterion. This may result in the determination of artifacts, which are characterized by the so-called light-and-shadow effect. It is thus possible to determine during manufacture whether the butting is sufficiently good to continue the detector manufacturing process, or not.

13 Claims, 3 Drawing Sheets

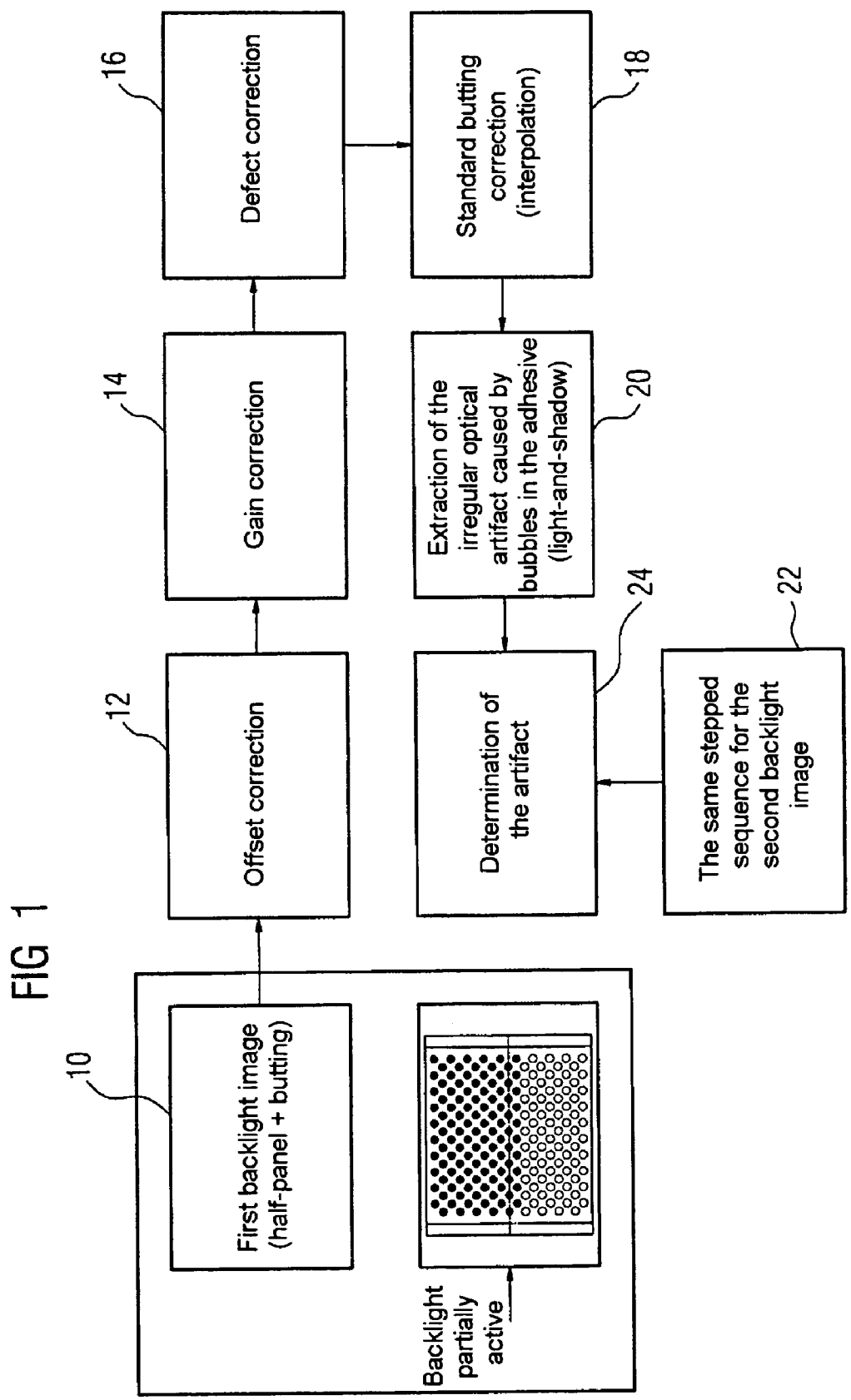

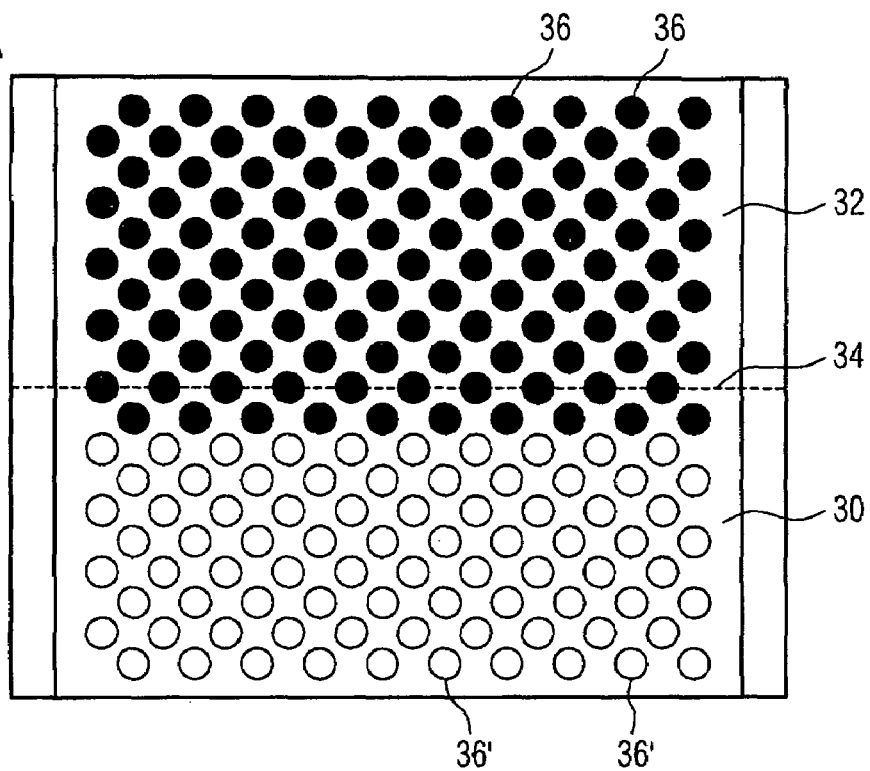
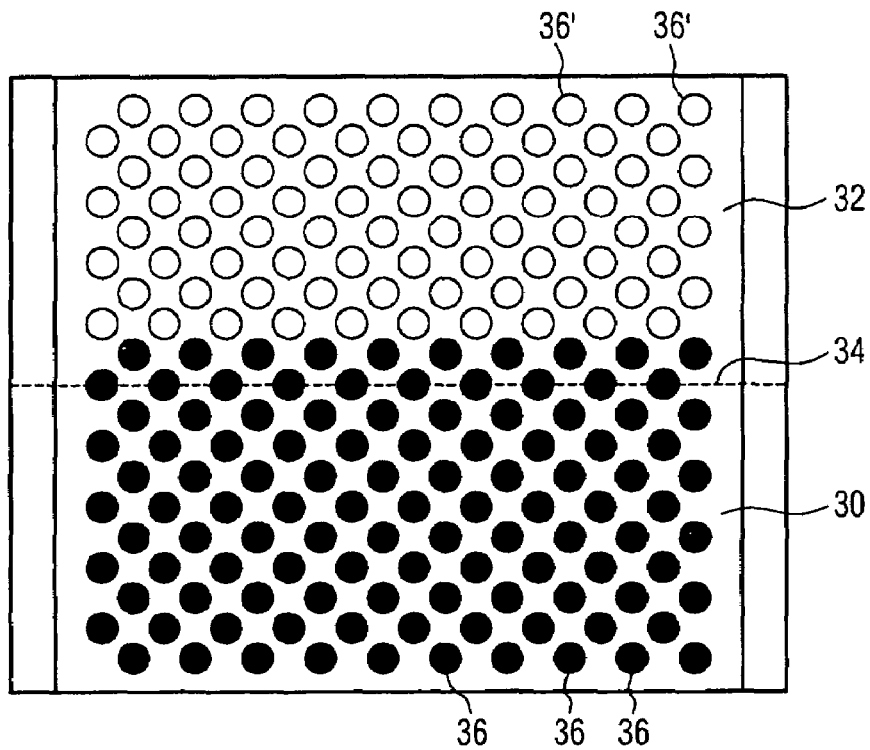

METHOD FOR DETERMINATION OF THE QUALITY OF A BUTTING ON AN AT LEAST PARTIALLY MANUFACTURED X-RAY DETECTOR

PRIORITY STATEMENT

The present application hereby claims priority under 35 U.S.C. §119 on German patent application number DE 10 2005 041 631.4 filed Sep. 1, 2005, the entire contents of which is hereby incorporated herein by reference.

FIELD

The present invention generally relates to a method for determination of the quality of a butting on an at least partially manufactured flat X-ray detector.

BACKGROUND

Flat X-ray detectors currently have usable areas of up to 43×43 cm$^2$. In order to manufacture these sizes, it is necessary to manufacture the basic component, the plate (which, for example, is composed of amorphous silicon) with a large area. Since machines in production are not designed for sizes such as these, it is known to join together a plurality of plates and to adhesively bond them to one another on a substrate, for example a glass substrate. This process of bonding them to one another is also referred to as butting. A large-area flat detector may include, for example, two or four individual plates. By way of example, the Pixium 4600 detector from the Trixell Company has four individual plates composed of amorphous silicon.

Since adhesive is used for the butting process, and its behavior is not ideal, this results in principle in butting structures which have defects over the entire width of the images recorded using the completed flat X-ray detector.

One particular type of defect is caused by bubbles in the adhesive used for the butting process, and by local areas in which there is no adhesive. These particular artifacts are locally limited to specific areas in the butting zone. They are distinguished by disturbing structures in the images, particularly in the case of irradiation processes from one side, which are limited to only one plate (that is to say a half-panel or quarter-panel). These local artifacts normally have a size of five or six lines or columns on each plate side. These defects can be identified by a light-and-shadow effect, normally with disturbing brightening of the image on one side of the butting zone, and darkening of the image on the other side of the butting zone.

The artifacts may be sufficiently disturbing that a flat X-ray detector which exhibits them can no longer be used, and must be assessed as scrap.

It is problematic to record the artifacts at all by measurement. Developments are known for measurement of this effect using X-ray radiation. The detector is irradiated using lead plates, which cover a plate in such a manner that they extend slightly above the butting zone. That part of the detector which is not covered is in this case subjected to direct radiation. The problem is the accuracy of the lead-plate arrangement and the reproducibility of the measurements, as well as the time taken. Furthermore, the detector must be manufactured completely, and in particular must already have a scintillator for conversion of X-ray radiation to light which can be detected by the plates.

SUMMARY

At least one embodiment of the invention specifies a method which can be used to determine the quality of a butting even during manufacture, that is to say the quality of a butting on an at least partially manufactured flat X-ray detector. In this case, one aim may be to carry out the measurement as far as possible in an automated manner, so that, as far as possible, no human actions are required.

The method in at least one embodiment, is based on a further development of the method for checking the quality of a butting that is known from the German Patent Application with the file reference 102005029459.6, which was published after the filing date of the present application, the entire contents of which are incorporated herein by reference.

The method stated there uses backlight from a backlight board to survey the butting zone. A backlight board such as this is a light-emitting diode board, which covers the detector size, underneath the plates and the glass substrate, onto which the plates are adhesively bonded. While scintillator X-ray light is converted to visible light on the front face of the complete flat X-ray detector, visible light can be injected directly from the rear face with the aid of the backlight board, and can be used for signal generation for image recording.

Thus, in the case of at least one embodiment of the invention, the backlight board simulates the X-ray radiation. At least one embodiment of the invention can thus be used during the manufacturing process (at the earliest) from the state from which the flat X-ray detector already has the glass plate with the detector plates, which has been connected by butting, and the backlight board for illumination of the plates through the glass plate. Although the flat X-ray detector may also already have the scintillator, this is, however, not necessary to carry out the check according to at least one embodiment of the invention.

In at least one embodiment of the invention, the backlight board and the detector plates are used to record at least one backlight image. A backlight image is an image in which the detector operates in the same way as it otherwise would for reception of X-ray radiation, with the exception that, instead of the X-ray radiation being converted into light, the backlight produces the signals directly in the individual elements which define a pixel.

A feature of at least one embodiment of the invention is that the backlight image is evaluated automatically in order to determine whether, in the zone of the image of the butting structure, it has areas which are illuminated more than averagely strongly or weakly, based on a predetermined assessment criterion.

The invention, in at least one embodiment, thus expressly searches for the light-and-shadow effect.

A plurality of backlight images can be recorded, for example for different light intensities of the backlight board, simulating different X-ray doses for the flat X-ray detector.

In one example embodiment of the method according to the invention, the backlight board is driven such that during the recording of the backlight image, only a portion of the backlight board images light. The backlight image thus has a zone which is produced by detector elements which have not been illuminated with light on the detector plates. In other words, these detector elements which have not been illuminated with light emit dark signals.

This situation corresponds to the surveying of the flat X-ray detector, as described above with reference to the prior art, with the assistance of lead plates which cover a part of the image, and extend just over the butting zone. On the one hand, from experience, the artifacts are amplified in this way.

On the other hand, the dark-image zone can be used as a reference zone for determination of a value which is used in the course of presetting a predetermined assessment criterion for comparison with values which are associated with other image areas. In other words, the reference zone can be used for the first time to define the level at which a signal value is emitted when no light at all strikes the detector elements. This makes it easier to define what light incidence can be regarded as being more than averagely strong or weak.

In one example embodiment, the image in the zone of the image of the butting structure is checked on an area-by-area basis for blocks, which overlap one another by up to 80%, and preferably overlap one another by up to half, and those which have 10 to 40×10 to 40 pixels, preferably 30×30 pixels. A mean value is formed for each block from the image gray-scale values which are associated with the pixels of that block. This mean value is related to a mean value of the image gray-scale values in the reference zone, (which can also be defined on the basis of the formation of subareas in the reference zone which run parallel to the blocks mentioned above). A threshold-value criterion for the difference is used to determine whether the mean value which has been related (to the reference mean value) in one block is considerably higher or lower than in the other blocks.

In a modification of the method according to at least one embodiment of the invention, a single data value can be obtained over the area of all the blocks, which indicates whether or not an artifact is imaged in at least one of the blocks. This single data value can be used to determined whether the flat X-ray detector shall be assessed as scrap, or whether it can be regarded as being sufficiently useful.

In one example embodiment of the method according to the invention, two backlight images are recorded.

In the case of a butting zone which runs horizontally and centrally, the first backlight image is recorded such that the image is recorded using somewhat more than the upper half of the backlight board. This upper half is defined such that a lower image zone remains unilluminated as a reference zone, while an upper image zone is illuminated together with the centrally arranged butting zone. Those areas in the upper part of the image which are illuminated more strongly or weakly than on average are then determined, and these areas are associated with a first area preselection.

The second backlight image is recorded with the backlight board being driven in the opposite manner. In other words, this means that the image is recorded using somewhat more than the lower half of the backlight board, in such a manner that an upper image zone remains unilluminated as a reference zone, but a lower image zone is illuminated together with the centrally arranged butting zone. This is then used to determine which areas in the lower part of the image are illuminated more strongly or more weakly. These areas are associated with a second area preselection.

A check is then carried out to determine whether areas from the first area preselection and from the second area preselection are associated with one another in pairs. A check is carried out for this purpose, in order to determine whether a relatively strongly illuminated area from one of the area preselections is located physically close to a relatively weakly illuminated area from the other area preselection. The position of the corresponding area is normally governed by the definition of the block-by-block check.

The presence of a pair of areas such as these is used to indicate the presence of an artifact which will adversely affect the quality of the flat X-ray detector. In other words, this example embodiment makes use of the criterion in which the two half-panel records are considered together with one another in which an upper area or a lower area is in each case not illuminated, with the artifacts in each case being indicated in the area of the butting zone that is currently still illuminated. This makes it possible to exclude qualitatively different artifacts from the artifacts which are distinguished by light-and-shadow effect, thus concentrating exclusively on the detection of the latter.

During the manufacture of a flat X-ray detector, in which the measurement by way of the backlight is carried out after the butting process has been carried out and the backlight board has been fitted, but before the fitting of the scintillator, the flat X-ray detector, which has been only partially manufactured, is treated as scrap if it exhibits excessive artifacts. In this case, it is possible to use a threshold-value criterion relating to the number of artifacts—a single one of a specific size is normally sufficient.

The backlight image is preferably not used directly for an evaluation of the type described above, it is first of all subjected to image processing. This may include an offset correction, a pixel-by-pixel gain correction, defect correction, or filtering operations such as median filtering or low-pass filtering. Furthermore, a conventional butting correction process can be carried out, for example using the butting cross process, in which an interpolation process is carried out in the butting zone over a specific number of pixels, in order to smooth out areas in the image which have been adversely affected by the butting zone.

BRIEF DESCRIPTION OF THE DRAWINGS

One example embodiment of the invention will now be described with reference to the drawings, in which:

FIG. 1 shows the steps of the method according to at least one embodiment of the invention for determination of an artifact in a flat X-ray detector;

FIG. 2 shows, schematically, the switching of the backlight for a detector with horizontal butting, as is used for at least one embodiment of the present invention, specifically on the one hand (FIG. 2A) with an upper half-panel being illuminated, and on the other hand (FIG. 2B) with a lower half-panel being illuminated.

DETAILED DESCRIPTION OF THE EXAMPLE EMBODIMENTS

Figure 3:
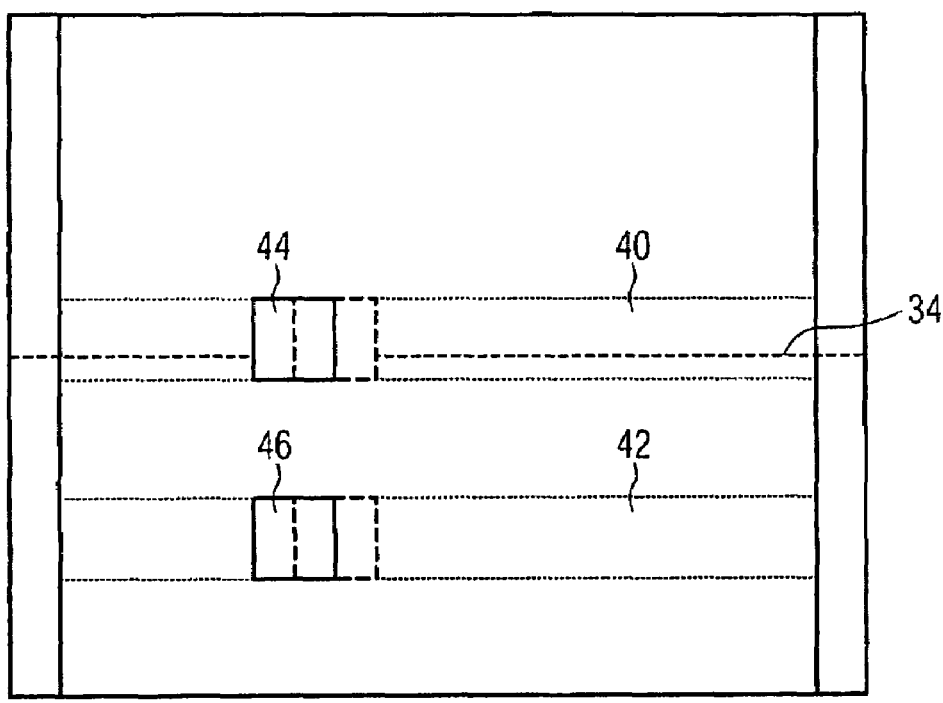
FIG. 3 shows the area-by-area checking of a backlight image in blocks of 30×30 pixels, schematically.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

The method according to an embodiment of the invention is based on the assumption of an at least partially manufactured flat X-ray detector, which does not necessarily already have a scintillator (further X-ray images could be recorded), but with the aid of which at least backlight images can in any case be recorded. Thus, the flat X-ray detector has at least one glass plate with detector plates, which have been connected by butting, and a backlight board for illumination of the plates through the glass plate.

Two backlight images are recorded for an embodiment of the invention. The step of recording the first backlight image is annotated by 10 in FIG. 1. The nature of the illumination through the backlight board is in each case different in the two backlight images. As is illustrated in FIG. 2A, the upper part of the flat X-ray detector as well as the butting area are illuminated in a first backlight image. In FIG. 2A, the lower part is identified by 30 and the upper part by 32, while the butting structure is identified by 34.

In its entirety, FIG. 2A shows, schematically, a large number of light-emitting diodes 36, 36'. It should be imagined that FIGS. 2A and 2B each show a view through the glass plate looking, so to speak, through the X-ray detector plate which forms the lower part of the illustrated flat X-ray detector 30, and through the second plate, which forms the upper part 32 of the flat X-ray detector. This view is also seen through the butting zone 34. The active light-emitting electrodes are in this case shown in a dark color and are identified by 36, while those light-emitting electrodes which are not active remain in a white color, and are identified by 36'.

Thus, in one case, an upper area 30 of the light-emitting electrodes is irradiated, as well as the butting zone 34 with an area going somewhat beyond it (which may be about 100 pixels), while the second backlight image as shown in FIG. 2B is recorded using light-emitting electrodes which are active in the lower part of the image 32, and also cover a part of the lower area 30, going somewhat beyond it, inclusive of the butting zone 34.

A first backlight image as shown in FIG. 2A is thus recorded in the first step, which is identified as the step 10 in FIG. 1.

An offset correction is carried out in the next step 12. For an offset correction, a dark-image element is subtracted from a light image, that is to say those image signals which the detectors record without any radiation being emitted.

A gain correction is carried out in the next step 14. In the case of a gain correction, the gain behavior of the individual detector elements is corrected pixel-by-pixel, by calculation.

A defect correction process is then carried out in step 16. In the case of a defect correction process, an interpolation process is carried out in order to compensate for the fact that there are detector elements which are not responding (they are dead), with a smoothing process being carried out by interpolation over the corresponding image values.

A standard butting correction is carried out in the next step 18. For a standard butting correction, an interpolation process is carried out for the pixel values over a certain butting zone width. This can be predetermined to be fixed or else may be defined as being variable (in one example embodiment) on the basis of a measurement.

A sufficiently large number of processing steps have now been carried out on the first backlight image so that a jump can be made to the step 20, in which the irregular optical artifact caused by bubbles in the adhesive, distinguished by the light-and-shadow effect, is extracted. This step 20 will be described with reference to FIG. 3. In the course of step 20, a band 40 around the butting zone 34 is now investigated. The illustration in FIG. 3 is associated with FIG. 2A, in which the upper part of the image is illuminated. The band 40 around the butting zone 34 thus extends somewhat more above the butting zone than below the butting zone. A second band 42 is used as a reference band, and corresponds to those image areas which have been produced by non-illumination of the corresponding detector elements.

The band 40 defines a sequence of square blocks 44, which are checked successively, with the already checked block being shown by dashed lines in FIG. 3. The sequence of blocks covers an area of 15×30 pixels, that is to say half. A mean value $m_{signal}$ of the gray-scale values from the 30×30 pixel elements is defined in each block 44. At the same time, a reference mean value $m_{reference}$ is formed in a block 46, which is formed in the band 42, and is located at the same height along the horizontal. The reference mean value corresponds to the mean value from those image gray-scale values which are produced by non-illumination of a corresponding area.

The mean value from the block 44 is now divided by the mean value from the block 46. This results in a relative mean value $M=m_{signal}/m_{reference}$, where $m_{signal}$ is the mean value in the block 44, and $m_{reference}$ is the mean value in the block 46.

An irregular optical artifact caused by bubbles in the adhesive in the butting zone 34 is now distinguished by a lighter area of the image or by a shadow being thrown. Both of these lead to discrepancies in the mean value from a predetermined limit range. In other words, an irregular optical artifact can be assumed to be present in the block 44 when:

$|M-M_{average}|>\Delta M_{limit}$, where $M_{average}$ is a normal mean value in a block 44 without any irregular optical artifact, and $\Delta M_{limit}$ is a threshold value which characterizes an artifact.

In the method according to an embodiment of the invention, the second backlight image is now recorded as shown in FIG. 2B, and the same sequence of steps 12 to 20 is passed through again.

In this case, the band 40 is chosen to be located somewhat lower in step 20, and the reference band 42 is chosen to be in the upper area of the image (see the illumination as shown in FIG. 2B).

The next step 24 is then used to determine whether mutually associated blocks in the two different steps 20 for the first backlight image and for the second backlight image have led to the finding of an artifact in a specific area around the butting zone 34. This can be identified from the fact that, on the one hand as is shown by way of example in the area 44 in FIG. 3, a lighter area is determined above the butting structure and a darker area is on the other hand found in the somewhat lower area 44, that is to say a shadow. Together, this results in the determination of an artifact, which exhibits the light-and-shadow effect.

The invention is not restricted to the type of evaluation process using a reference value, as described here. It is sufficient to identify a lighter area and a shadow at the same time in a (preprocessed) image in any manner.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determination of quality of a butting on an at least partially manufactured flat X-ray detector, the detector including a mounting plate with detector plates connected by butting and including a backlight board for illumination of the plates through the mounting plate, the method comprising:
   recording at least one backlight image with the aid of the backlight board and the detector plates;
   automatically evaluating, based on an assessment criterion, the at least one backlight image in order to determine whether, in the zone of the image of the butting structure, the at least one backlight image has areas which are illuminated more or less than an average value; and
   determining a quality of the butting on the at least partially manufactured flat X-ray detector based on the automatic evaluation of the at least one backlight image.

2. The method as claimed in claim 1, wherein, during the recording of the backlight image, only a portion of the backlight board images light so that the backlight image has a zone which is produced by detector elements, which have not been illuminated with light on the detector plates, and wherein
   the zone is used as a reference zone for determination of a value used in the course of presetting the assessment criterion for comparison with values which are associated with other image areas.

3. The method as claimed in claim 2, wherein the image in the zone of the image of the buffing structure is checked on an area-by-area basis for blocks, which overlap one another by at least one of up to 80%, up to half of 10 to 40×10 to 40 pixels, and 30×30 pixels, and wherein
   a mean value for each block is formed from the image gray-scale values associated with the pixels in that block, the mean value being related to a mean value of the image gray-scale values in the reference zone, and
   a threshold-value criterion for the difference is used to determine whether the mean value, which has been related in one block, is higher or lower than in the other blocks.

4. The method as claimed in claim 3, wherein two backlight images are recorded, and wherein:
   in the case of a first backlight image with a butting zone running horizontally and centrally, the image is recorded using more than an upper half of the backlight board and such that a lower image zone remains unilluminated as a reference zone, while an upper image zone is illuminated together with the centrally arranged butting zone, the recorded image being used to determine which areas in the upper part of the image are illuminated more than an average value, with these areas being associated with a first area preselection,
   in the case of a second backlight image with a butting zone running horizontally and centrally, the image is recorded using more than a lower half of the backlight board and such that an upper image zone remains unilluminated as a reference zone, while a lower image zone is illuminated together with the centrally arranged butting zone, the recorded image being used to determine which areas in the lower part of the image are illuminated more than an average value, with these areas being associated with a second area preselection, and wherein
   a check is carried out to determine whether a strongly illuminated area of an area preselection is located physically close to a weakly illuminated area from the other area selection, the presence of a pair of these areas indicating the presence of an artifact, which will adversely affect the quality of the flat X-ray detector.

5. The method as claimed in claim 2, wherein two backlight images are recorded, and wherein
   in the case of a first backlight image with a butting zone running horizontally and centrally, the image is recorded using more than an upper half of the backlight board and such that a lower image zone remains unilluminated as a reference zone, while an upper image zone is illuminated together with the centrally arranged butting zone, the recorded image being used to determine which areas in the upper part of the image are illuminated more than an average value, with these areas being associated with a first area preselection,
   in the case of a second backlight image with a butting zone running horizontally and centrally, the image is recorded using more than a lower half of the backlight board and such that an upper image zone remains unilluminated as a reference zone, while a lower image zone is illuminated together with the centrally arranged butting zone, the recorded image being used to determine which areas in the lower part of the image are illuminated more than an average value, with these areas being associated with a second area preselection, and wherein
   a check is carried out to determine whether a strongly illuminated area of an area preselection is located physically close to a weakly illuminated area from the other area selection, the presence of a pair of these areas indicating the presence of an artifact, which will adversely affect the quality of the flat X-ray detector.

6. The method as claimed in claim 2, wherein the image in the zone of the image of the butting structure is checked on an area-by-area basis for blocks, which overlap one another by up to half of 10 to 40×10 to 40 pixels, and wherein a mean value for each block is formed from the image gray-scale values associated with the pixels in that block, the mean value being related to a mean value of the image gray-scale values in the reference zone, and wherein a threshold-value criterion for the difference is used to determine whether the mean value, which has been related in one block, is higher or lower than in the other blocks.

7. The method as claimed in claim 2, wherein the image in the zone of the image of the butting structure is checked on an area-by-area basis for blocks, which overlap one another by up to half of 30×30 pixels and a mean for each block is formed from the image gray-scale values, which are associated with the pixels in that block, the mean value being related to a mean value of the image gray-scale values in the reference zone, and wherein a threshold-value criterion for the difference is used to determine whether the mean values, which has been related in one block, is higher or lower than in the other blocks.

8. The method as claimed in claim 2, wherein each backlight image is subjected to image processing before evaluation.

9. The method as claimed in claim 8, wherein the image processing includes at least one of an offset correction, a pixel-by-pixel gain correction, a defect correction, median filtering, low-pass filtering and image gray-sale value interpolation in the area of the butting zone.

10. A computer readable medium including program segments for, when executed on a computer device, causing the computer device to implement the method of claim 2.

11. The method as claimed in claim 1, wherein each backlight image is subjected to image processing before evaluation.

12. The method as claimed in claim 11, wherein the image processing includes at least one of an offset correction, a pixel-by-pixel gain correction, a defect correction, median filtering, low-pass filtering and image gray-sale value interpolation in the area of the butting zone.

13. A computer readable medium including program segments for, when executed on a computer device, causing the computer device to implement the method of claim 1.

* * * * *